United States Patent
Krishnan et al.

(10) Patent No.: US 10,346,191 B2
(45) Date of Patent: Jul. 9, 2019

(54) SYSTEM AND METHOD FOR MANAGING SIZE OF CLUSTERS IN A COMPUTING ENVIRONMENT

(71) Applicant: VMware, Inc., Palo Alto, CA (US)

(72) Inventors: Manoj Krishnan, Palo Alto, CA (US); Anant Agarwal, San Jose, CA (US); Rahul Chandrasekaran, Mountain View, CA (US); Prafulla Mahindrakar, San Jose, CA (US); Ravi Cherukupalli, San Ramon, CA (US)

(73) Assignee: WMware, Inc., Palo Alto, CA (US)

( * ) Notice: Subject to any disclaimer, the term of this patent is extended or adjusted under 35 U.S.C. 154(b) by 259 days.

(21) Appl. No.: 15/368,381

(22) Filed: Dec. 2, 2016

(65) Prior Publication Data
US 2018/0157511 A1    Jun. 7, 2018

(51) Int. Cl.
*G06F 9/455* (2018.01)
*G06F 9/50* (2006.01)

(52) U.S. Cl.
CPC ........ *G06F 9/45558* (2013.01); *G06F 9/5077* (2013.01); *G06F 9/5088* (2013.01); *G06F 2009/4557* (2013.01)

(58) Field of Classification Search
CPC ............... G06F 9/45558; G06F 9/5088; G06F 2009/4557
See application file for complete search history.

(56) References Cited

U.S. PATENT DOCUMENTS

| | | | | |
|---|---|---|---|---|
| 7,039,694 B2 * | 5/2006 | Kampe | ............... | H04L 41/0618 709/216 |
| 7,197,632 B2 * | 3/2007 | Rao | ..................... | G06F 11/1435 709/220 |
| 7,296,268 B2 * | 11/2007 | Darling | ................ | G06F 9/5061 709/230 |
| 7,516,221 B2 * | 4/2009 | Souder | .................. | G06F 9/5027 709/226 |
| 7,644,144 B1 * | 1/2010 | Horvitz | .................. | G06Q 10/10 709/203 |
| 7,739,541 B1 * | 6/2010 | Rao | ..................... | G06F 11/0709 709/205 |
| 7,739,677 B1 * | 6/2010 | Kekre | ................... | G06F 11/202 709/214 |
| 7,774,010 B2 * | 8/2010 | Kokkonen | ............ | H04L 41/042 370/260 |
| 9,524,389 B1 * | 12/2016 | Roth | ..................... | G06F 21/554 |

(Continued)

OTHER PUBLICATIONS

Auto Scaling, User Guide. Amazon web services. 2016.

*Primary Examiner* — Adam Lee
(74) *Attorney, Agent, or Firm* — Thomas | Horstemeyer, LLP (57) ABSTRACT

A number of hosts in a logical cluster is adjusted up or down in an elastic manner by tracking membership of hosts in the cluster using a first data structure and tracking membership of hosts in a spare pool using a second data structure, and upon determining that a triggering condition for adding another host is met and that all hosts in the cluster are being used, selecting a host from the spare pool, and programmatically adding an identifier of the selected host to the first data structure and programmatically deleting the identifier of the selected host from the second data structure.

18 Claims, 9 Drawing Sheets

(56) References Cited

U.S. PATENT DOCUMENTS

| | | | | |
|---|---|---|---|---|
| 9,696,985 B1* | 7/2017 | Gupta | | G06F 8/65 |
| 2002/0042830 A1* | 4/2002 | Bose | | H04L 29/06 |
| | | | | 709/230 |
| 2004/0015581 A1* | 1/2004 | Forbes | | H04L 67/1095 |
| | | | | 709/224 |
| 2004/0039815 A1* | 2/2004 | Evans | | G06F 9/5066 |
| | | | | 709/225 |
| 2004/0148333 A1* | 7/2004 | Manion | | H04L 63/104 |
| | | | | 709/201 |
| 2005/0193113 A1* | 9/2005 | Kokusho | | G06F 9/5083 |
| | | | | 709/225 |
| 2006/0050629 A1* | 3/2006 | Saika | | H04L 41/0663 |
| | | | | 370/216 |
| 2006/0248159 A1* | 11/2006 | Polan | | H04L 41/0273 |
| | | | | 709/208 |
| 2007/0233698 A1* | 10/2007 | Sundar | | G06F 8/60 |
| 2007/0274525 A1* | 11/2007 | Takata | | H04L 63/065 |
| | | | | 380/270 |
| 2008/0005321 A1* | 1/2008 | Ma | | H04L 41/0893 |
| | | | | 709/224 |
| 2009/0113034 A1* | 4/2009 | Krishnappa | | G06F 15/16 |
| | | | | 709/223 |
| 2010/0106990 A1* | 4/2010 | Kalman | | G06F 1/3221 |
| | | | | 713/323 |
| 2010/0115621 A1* | 5/2010 | Staniford | | H04L 63/1416 |
| | | | | 726/25 |
| 2011/0247072 A1* | 10/2011 | Staniford | | H04L 63/1416 |
| | | | | 726/24 |
| 2013/0054743 A1* | 2/2013 | Feher | | H04L 65/4076 |
| | | | | 709/217 |
| 2013/0080559 A1* | 3/2013 | Rao | | H04L 67/1097 |
| | | | | 709/208 |
| 2013/0144990 A1* | 6/2013 | Gao | | G06F 9/5072 |
| | | | | 709/220 |
| 2013/0173781 A1* | 7/2013 | Abuelsaad | | H04L 41/5019 |
| | | | | 709/224 |
| 2013/0205017 A1* | 8/2013 | Hirose | | H04L 43/0817 |
| | | | | 709/224 |
| 2013/0262664 A1* | 10/2013 | Yamada | | G06F 9/5061 |
| | | | | 709/224 |
| 2013/0311659 A1* | 11/2013 | Curran | | H04L 67/1097 |
| | | | | 709/225 |
| 2014/0074987 A1* | 3/2014 | Martz | | G06F 21/6272 |
| | | | | 709/219 |
| 2016/0094643 A1* | 3/2016 | Jain | | H04L 45/44 |
| | | | | 709/226 |
| 2017/0048163 A1* | 2/2017 | Pan | | H04L 67/28 |

* cited by examiner

SYSTEM AND METHOD FOR MANAGING SIZE OF CLUSTERS IN A COMPUTING ENVIRONMENT

BACKGROUND

A virtual machine (VM) is a software abstraction of a physical computing system capable of running one or more applications under the control of a guest operating system, where the guest operating system interacts with an emulated hardware platform, also referred to as a virtual hardware platform. One or multiple VMs and a virtual hardware platform are executed on a physical host device, such as a server-class computer. VMs are frequently employed in data centers, cloud computing platforms, and other distributed computing systems, and are executed on the physical host devices of such systems. Typically, these host devices are logically grouped or "clustered" together as a single logical construct. Thus, the aggregated computing and memory resources of the cluster that are available for running VMs can be provisioned flexibly and dynamically to the various VMs being executed.

However, there are also drawbacks to organizing host devices in clusters when executing VMs. For example, when cluster utilization is nearly full, i.e., when computing, memory, and/or networking resources of a cluster are fully utilized, VM availability can be compromised and VM latency increased significantly. While the performance of VMs in a cluster with high utilization can be improved by a system administrator manually adding host devices to the cluster and/or migrating VMs across clusters (e.g., to a less utilized cluster), such customizations are generally not scalable across the plurality of clusters included in a typical distributed computing environment and require VMs to be powered down. Further, performing such manual customizations in real time in response to dynamic workloads in a cluster is generally impracticable. Instead, manual customization of clusters is typically performed on a periodic basis, e.g., daily or weekly.

In addition, to maximize VM availability, clusters of host devices often include reserved failover capacity, i.e., host devices in the cluster that remain idle during normal operation and are therefore available for executing VMs whenever a host device in the cluster fails. Such reserved failover capacity can make up a significant portion of the resources of a cluster, but are infrequently utilized. For example, for a distributed computing system that includes 50 clusters, where each cluster includes 10 host devices and has a failover capacity of 20%, then the capacity equivalent to 100 host devices are unused in the system until a failure occurs. Because failures are relatively infrequent, the majority of this reserved failover capacity is infrequently utilized, thereby incurring both capital and operational costs for little benefit.

SUMMARY

According to embodiments, a number of hosts in a logical cluster is adjusted up or down in an elastic manner. A method of adjusting the number of hosts in the cluster, according to an embodiment, includes the steps of tracking membership of hosts in the cluster using a first data structure and tracking membership of hosts in a spare pool using a second data structure, and upon determining that a triggering condition for adding another host is met and that all hosts in the cluster are being used, selecting a host from the spare pool, and programmatically adding an identifier of the selected host to the first data structure and programmatically deleting the identifier of the selected host from the second data structure.

Further embodiments provide a non-transitory computer-readable medium that includes instructions that, when executed, enable a computer to implement one or more aspects of the above method, and a system of computers including a management server that is programmed to implement one or more aspects of the above method.

DETAILED DESCRIPTION

Figure 1:
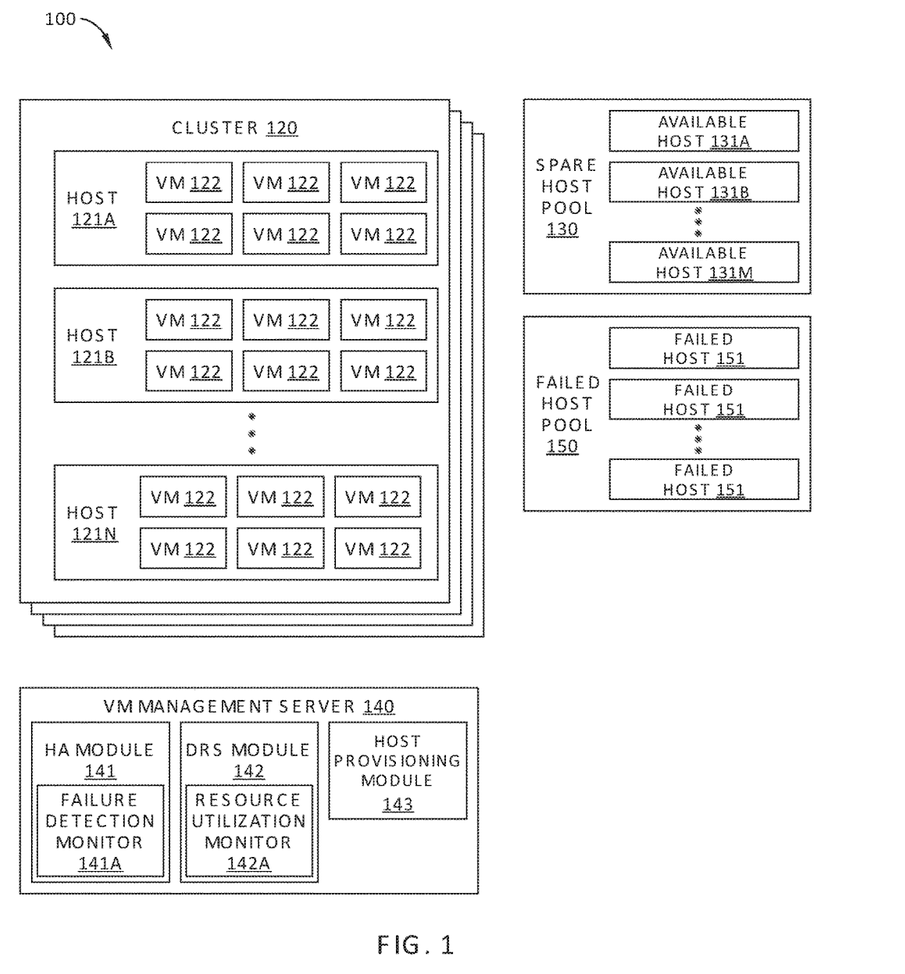
FIG. 1 illustrates a computing environment, according to one embodiment.

FIG. 1 illustrates a computing environment 100, according to one embodiment. Computing environment 100 is a virtual data center, also referred to as a software-defined data center, and includes multiple clusters of host devices, or "clusters" 120, a spare host pool 130 of available physical host devices, or "hosts," a virtual machine (VM) management server 140, and, in some embodiments, a failed host pool 150. Computing environment 100 may include multiple virtual data centers residing within a single physical data center. Alternatively or additionally, the virtual components of computing environment 100 may be distributed across multiple physical data centers or locations.

Each cluster 120 of computing environment 100 includes a plurality of hosts 121A-121N (referred to collectively as hosts 121), each configured to execute one more VMs 122. According to various embodiments, the number N of hosts 121 logically included in a particular cluster 120 can be varied from a predetermined minimum value, for example four, to a maximum implementable value, for example 64 or 128. More specifically, one or more hosts 121 are logically added to and/or removed from a particular cluster 120 in response to utilization of the cluster exceeding a maximum utilization threshold value, falling below a minimum utilization threshold value, and/or detection of a partial or total host failure. One embodiment of hosts 121 is described in greater detail below in conjunction with FIG. 2.

Spare host pool 130 includes a plurality of available hosts 131A-131M (referred to collectively as hosts 131). According to various embodiments, the number M of hosts 131 logically included in spare host pool 130 can be varied dynamically. Specifically, as available hosts 131 are logically removed from spare host pool 130 and logically added to any of clusters 120 as additional hosts 121, the number M of available hosts 131 in spare host pool 130 decreases. Likewise, as hosts 121 are logically removed from any of cluster 120 and logically added to spare host pool 130 as available hosts 131, the number M of available hosts 131 in spare host pool 130 increases. Each of available hosts 131 may be substantially similar in physical configuration to hosts 121, which are described in greater detail below in conjunction with FIG. 2.

In some embodiments, spare host pool 130 may include available hosts 131 that are provisioned to computing environment 100 as cloud-based resources, and consequently are located at one more physical locations and/or data centers that are remote from the hosts 121 included in one or more of clusters 120. In other embodiments, available hosts 131 are located in the same physical location and/or data center as the hosts 121 included in one or more of clusters 120.

VM management server 140 implements a management plane of computing environment 100 and is configured to manage hosts 121 and available hosts 131 associated with computing environment 100. More specifically, VM management server 140 is configured to manage interactions between hosts 121, to determine when available hosts 131 are added to a particular cluster 120, and to determine when hosts 121 are removed from a particular cluster 120 and added to spare host pool 130. To that end, VM management server 140 includes a high availability (HA) module 141, a distributed resource scheduler (DRS) module 142, and a host provisioning module 143. HA module 141 and DRS module 142 are each configured for a computing environment in which clusters 120 are elastic, i.e., each cluster 120 can be dynamically increased and decreased in size in response to host failure and/or cluster utilization levels.

VM management server 140 typically runs on a computer host that is separate from hosts 121 and is accessible by a system administrator via a graphical user interface (GUI) or via a command line interface (CLI). In some embodiments, VM management server 140 may be configured to enable a system administrator to perform various management functions for computing system 100 in addition to the automated functionality of HA module 141 and DRS module 142. For example, VM management server 140 may be configured to enable a system administrator to deploy VMs 122 to the different hosts 121 in a particular cluster, monitor the performance of such VMs 122, and/or manually power up and power down VMs 122.

HA module 141 is configured to ensure availability of VMs 121 executing in each cluster 120 in response to a partial or total host failure. For example, when one of hosts 121 in a particular cluster 120 experiences a software crash or hardware fault and is no longer operable, HA module 141 is configured to trigger migration module 144 to migrate VMs executing in the failed host 121 to other hosts 121 within that cluster 120. In addition, according various embodiments, HA module 141 is configured with a failure detection module 141A to monitor clusters 120 for host faults. For example, failure detection module 141A periodically polls each host 121 in computing environment 100 for software crashes and/or hardware faults or evidence thereof. Alternatively or additionally, failure detection module 141A may be configured to receive fault warnings from hosts 121 in each cluster 120.

DRS module 142 is configured to maintain the utilization of hosts 121 in each cluster 120 between a minimum utilization threshold value and a maximum utilization threshold. To that end, DRS module 142 is configured to determine whether utilization of hosts 121 in each cluster 120 is above the minimum utilization threshold value and less than the maximum utilization threshold. For example, resource utilization monitor 142A in DRS module 142 polls the hosts 121 in each cluster 120 for utilization information, such as central processing unit (CPU) time, allocated memory, and the like. In addition, DRS module 142 is configured to perform conventional load balancing between hosts 121 within a particular cluster 120. For example, when resource utilization monitor 142A determines that the utilization of computing resources of a first host 121 in a particular cluster 120 is less than a minimum utilization threshold value, DRS module 142 triggers migration module 144 to perform migration of executing VMs 122 from more highly loaded hosts 121 to first host, which is lightly loaded. In this way, DRS module 142 maintains utilization of the computing resources of hosts 121 in a particular cluster 120 within an optimal range.

Host provisioning module 143 is configured to logically add one or more available hosts 131 to a cluster 120 or remove hosts 121 from the cluster 120 in response to a triggering event, so that utilization of computing resources of hosts 121 and availability of VMs 122 executing on hosts 121 are maintained within an optimal range. A triggering event may be detection of an average utilization of hosts 121 in a cluster 120 exceeding a maximum or minimum threshold value, or the detection of a host 121 in the cluster 120 undergoing a partial or total failure.

In one embodiment, host provisioning module 143 is configured to logically add one or more available hosts 131 to a particular cluster 120 when a host 121 in the particular cluster 120 suffers a partial or total failure. Afterwards, HA module 141 is able to migrate VMs executing in the failed host 121 to other hosts 121 within that cluster 120 and/or to the newly added available host 131. For example, when a large number of VMs 122 are executing in a particular cluster 120 and a host failure occurs, the physical computing resources per VM 122 are reduced, i.e., CPU time, allocated memory, etc., and availability for any particular VM 122 in the cluster 120 is also reduced. Thus, host provisioning module 143 is configured to rectify this issue by logically adding one or more available hosts 131 to the cluster 120 based not only on the detection of a host failure, but also on an availability of the VMs 122 executing in the cluster 120. Thus, in such embodiments, host provisioning module 143 may logically add one or more available hosts 131 to the cluster 120 experiencing the host failure when availability for one or more VMs 122 in the cluster 120 cannot be increased above the minimum threshold value via migration of VMs 122 within the cluster 120.

In some embodiments, host provisioning module 143 is configured to logically add available hosts 131 to a particular cluster 120 in which the utilization of computing resources of the hosts 121 in the particular cluster 120 is greater than a maximum utilization threshold for the cluster 120. Thus, host provisioning module 143 increases the total number hosts within the cluster when utilization is too high. Further, in some embodiments, host provisioning module 143 is configured to logically remove hosts 121 from a particular cluster 120 in which the utilization of hosts 121 in the particular cluster 120 is less than a minimum utilization threshold value for the cluster 120. In such embodiments, host provisioning module 143 decreases the total number of hosts within the cluster when utilization is too low.

Metrics for quantifying availability of a particular VM 122 may include, for example, effective CPU resources available for the VM 122 of interest (in MHz or GHz), effective memory resources available for the VM 122 of interest (in kB, MB, or GB), a CPU fairness value representing the fraction of host CPU resources allocated to the VM 122 of interest (in percent), and/or a memory fairness value representing the fraction of memory resources allocated to the VM 122 of interest (in percent). How and in what situations host provisioning module 143 logically adds available hosts 131 to and/or removes hosts 121 from a particular cluster 120 in response to host failures, low VM availability, and/or low or high host utilization is described below in conjunction with FIGS. 4-7.

As noted above, in some embodiments, computing environment 100 may include a failed host pool 150. Failed host pool 150 is a logical construct with which hosts 120 that have undergone a partial or total failure can be associated. Hosts 120 that have undergone either partial or total failure are logically associated with failed host pool 150 as failed hosts 151, so that these host devices cannot be subsequently added to a cluster 120 of computing environment 100. Thus, failed host pool 150 facilitates the identification of host devices in computing environment 100 that require maintenance, diagnostic analysis, and/or replacement.

Figure 2:
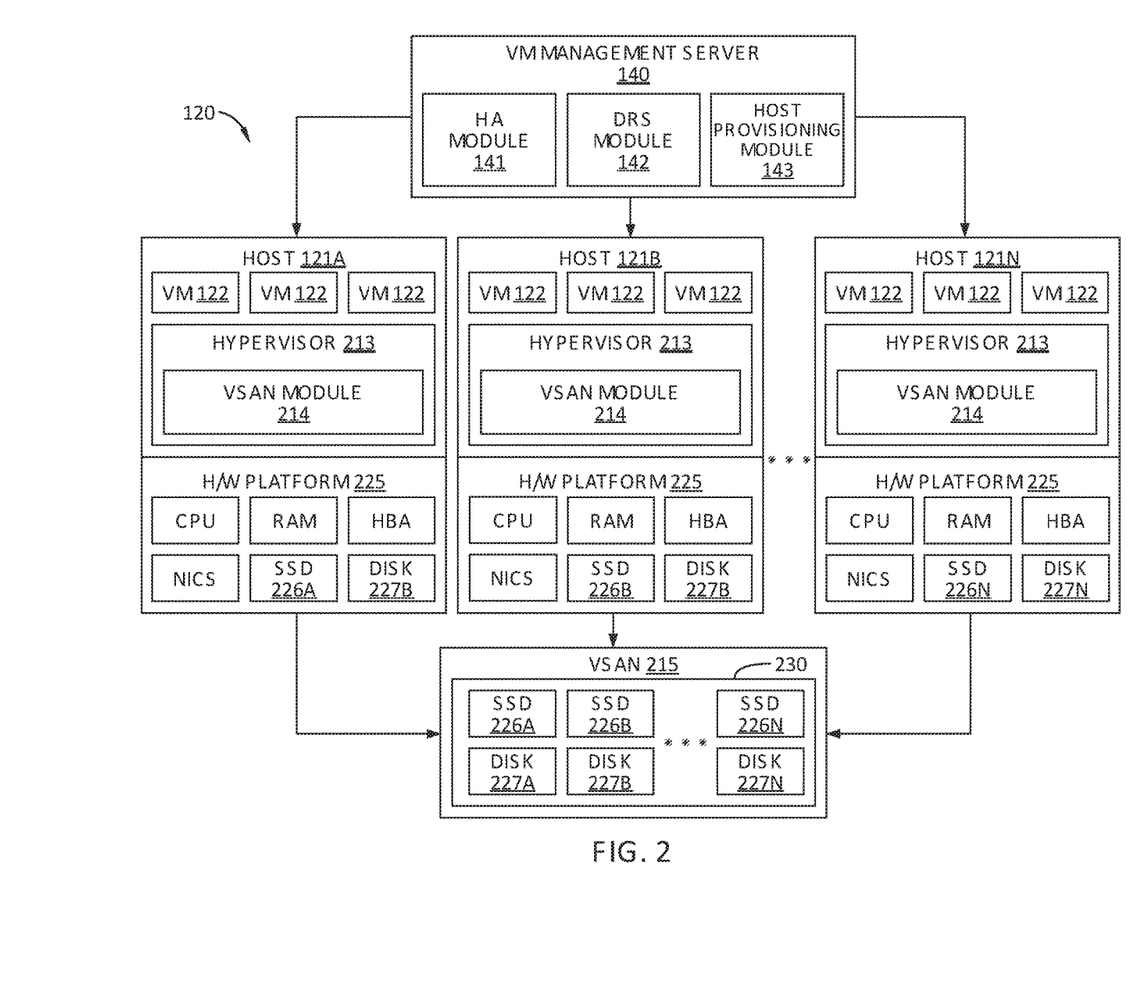
FIG. 2 is a conceptual diagram that depicts an expanded view of the hardware platform of a computer host of FIG. 1, according to one or more embodiments.

FIG. 2 schematically illustrates a cluster 120 of computing environment 100 in FIG. 1, according to one or more embodiments. As shown, cluster 120 includes up to N hosts 121, i.e., hosts 121A, 121B, . . . , 121N, each of which is communicatively coupled to VM management server 140. In the embodiment shown in FIG. 1, cluster 120 is a software-based "virtual storage area network" (VSAN) environment that leverages the commodity local storage resources housed in or directly attached to hosts 121 in cluster 120 to provide an aggregate object store 230 to virtual machines (VMs) 122 executing on hosts 121. Hereinafter, use of the term "housed" or "housed in" may be used to encompass both housed in or otherwise directly attached to.

Each host 121 is a computing device in which virtualization software and a plurality of VMs 122 are executing. Each host 121 is typically a server-class computer, although, in some embodiments, hosts 121 may include a variety of classes of computers, such as mainframe computers, desktop computers, and laptop computers. Each host 121 includes a virtualization layer or hypervisor 213, a storage management module (referred to herein as a "VSAN module") 214, and a hardware platform 225 that typically includes central processing units (CPUs), random access memory (RAM), local storage resources, such as solid state drives (SSDs) 226 and/or magnetic disks 227, a host bus adapter (HBA) that enable external storage devices to be connected to the host 120, and one or more physical NICs that enable host 121 to communicate over a network. These physical computing resources of each host 121 are managed by hypervisor 213, and through hypervisor 213, a host 121 is able to launch and run multiple VMs 122.

The local commodity storage resources housed in or otherwise directly attached to hosts 121 may include combinations of SSDs 226 and/or magnetic or spinning disks 227. In certain embodiments, SSDs 226 serve as a read cache and/or write buffer in front of magnetic disks 227 to increase I/O performance. VSAN module 214 in each host 121 is configured to automate storage management workflows (e.g., creating objects in object store 230) and provide access to objects in object store 230 (e.g., handling I/O operations to objects in object store 230). For each VM 122, VSAN module 214 may then create an "object" for the specified virtual disk associated with the VM 122 by backing the virtual disk with physical storage resources of object store 230 such as SSDs 226 and/or magnetic disks 227. For example, SSD 226A and magnetic disk 227A of host 121A, SSD 226B and magnetic disk 227B of host 121B, and so on may in combination be used to back object store 230.

Each VM 122 is a software abstraction of a physical computing system that is capable of running one or more applications under the control of a guest operating system (not shown), where the guest operating system provides various operating system services (such as central processing unit (or CPU) allocation and memory management). The guest operating system interacts with a virtual hardware platform, which is an emulated hardware platform for the corresponding VM. Virtual hardware platforms (not depicted in the figure) are implemented on a particular host 121 by hypervisor 213, and typically comprise virtual CPUs, virtual RAM, virtual disks, and, for network communication, a virtual network interface controller (or NIC). That applications executing within VMs 121 are executing in a virtual machine is transparent to operation of these applications. Thus, such applications may be installed in a VM 122 unchanged from how such applications would be installed on a physical computer.

Similarly, the fact that the guest operating system installed in each VM 122 is executing on top of a virtualized hardware platform, rather than on a physical hardware platform is transparent to the guest operating system. Thus, the guest operating system may be installed in a VM 122 in the same manner that the guest operating system is installed on a physical computer. Examples of guest operating systems include the various versions of Microsoft's Windows® operating system, the Linux operating system, and Apple's Mac OS X.

Each VM 122 executing in a particular cluster 120 accesses computing services by interacting with the virtual hardware platform associated with the particular cluster 120 and implemented by hypervisor 213. As shown, each host 121 has one hypervisor 213 executing therein. As noted above, hypervisor 213 provides a virtualization platform on which VMs 122 execute. Hypervisor 213 enables each VM 122 that executes under its control to access physical computing resources in host 120. Thus, when the guest operating system of a VM 122 schedules a process to be run on a virtual CPU of the virtual hardware platform, hypervisor 213 schedules the virtual CPU of that VM 122 to run on a physical CPU of host 120. In another example, an application executing in a VM 122 may require additional virtual RAM in order to execute a particular function. In this case, the application would issue a memory allocation request to the guest operating system, which would allocate an amount of virtual RAM to satisfy the request. In turn, hypervisor 213 would allocate a certain amount of physical RAM that corresponds to the allocated virtual RAM.

Hypervisor 213 also manages the physical computing resources of the corresponding host 120, and allocates those resources among the executing VMs 122, as well as other (i.e., non-VM) processes. Hypervisor 213 allocates physical CPU time to virtual CPUs in the VMs 122, as well as physical disk space to virtual disks for each of the VMs 122. Hypervisor 213 also enables the transmission and receipt of network traffic (through the virtual NICs) for each VM 122.

VSAN module 214 can, in some embodiments, be implemented as a VSAN device driver within hypervisor 213. In such embodiments, VSAN module 214 provides access to a conceptual VSAN 215 through which an administrator can create a number of top-level "device" or namespace objects that are backed by object store 230. In one common scenario, during creation of a device object, the administrator may specify a particular file system for the device object (referred to as "file system objects"). For example, each hypervisor 213 in each host 120 may, during a boot process, discover a/vsan/root node for a conceptual global namespace that is exposed by VSAN module 214. By, for example, accessing APIs exposed by VSAN module 214, hypervisor 213 can then determine the top-level file system objects (or other types of top-level device objects) currently residing in VSAN 215. When a VM 122 (or other client) attempts to access one of the file system objects in VSAN 215, hypervisor 213 may dynamically "auto-mount" the file system object at that time. Each VSAN module 214 communicates with other VSAN modules 214 of other hosts 121 in cluster 120 to create and maintain an in-memory metadata database that contains metadata describing the locations, configurations, policies, and relationships among the various objects stored in object store 230. Thus, in each host 121, such an in-memory metadata database is maintained separately but in synchronized fashion in the memory of each host 121.

In the embodiment illustrated in FIG. 2, hosts 121 in cluster 120 are connected to the same shared storage formed from aggregated local storage resources, i.e., object store 230, via a VSAN, i.e., VSAN 215. Alternatively, cluster 120 may be configured to connect hosts 121 to shared storage using other approaches. For example, in one embodiment, the shared storage may be provided through a storage area network (SAN), and access to the SAN is provided by the HBA in each host 121. In another embodiment, the shared storage may be provided by a network attached storage (NAS) which is accessed through the NIC in each host 121.

Figure 3A:
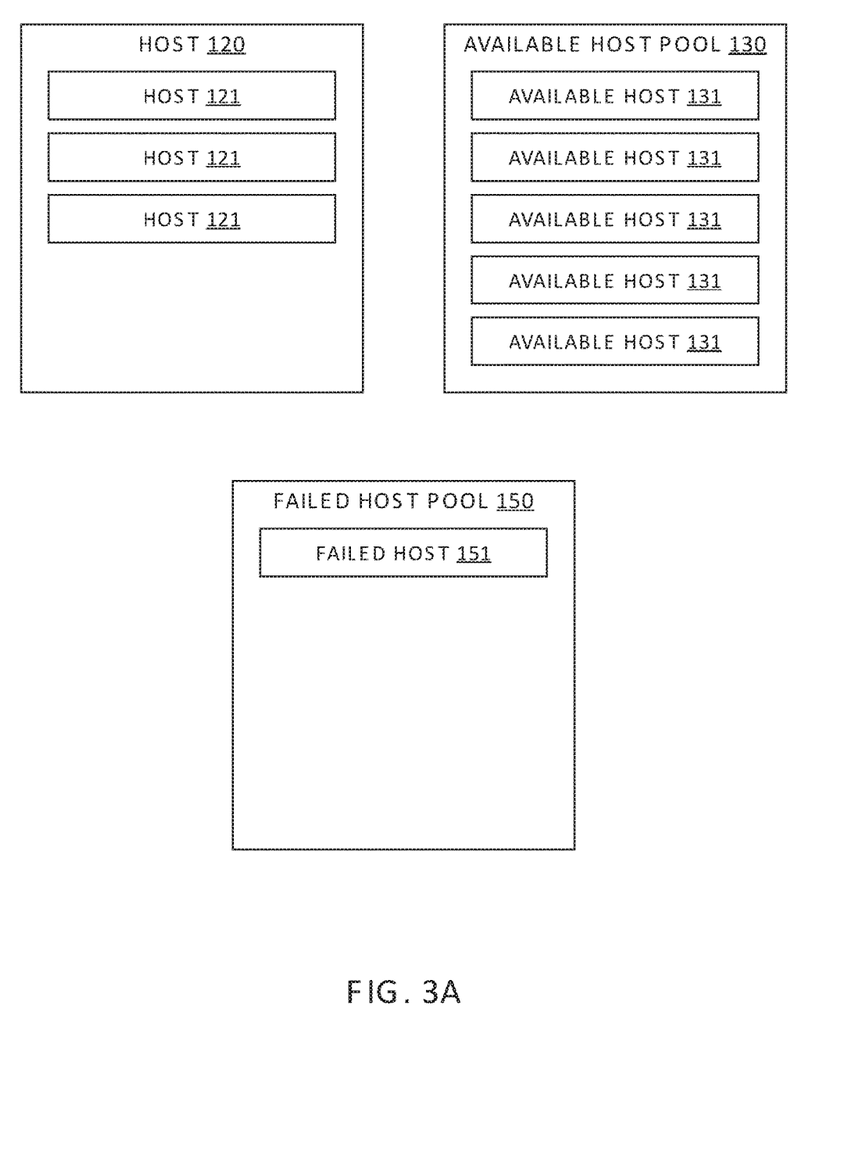
FIGS. 3A-3C are conceptual diagrams illustrating the logical removal of an available host from a spare host pool and the logical addition of the available host to one of the clusters, according to one or more embodiments.
Figure 3B:
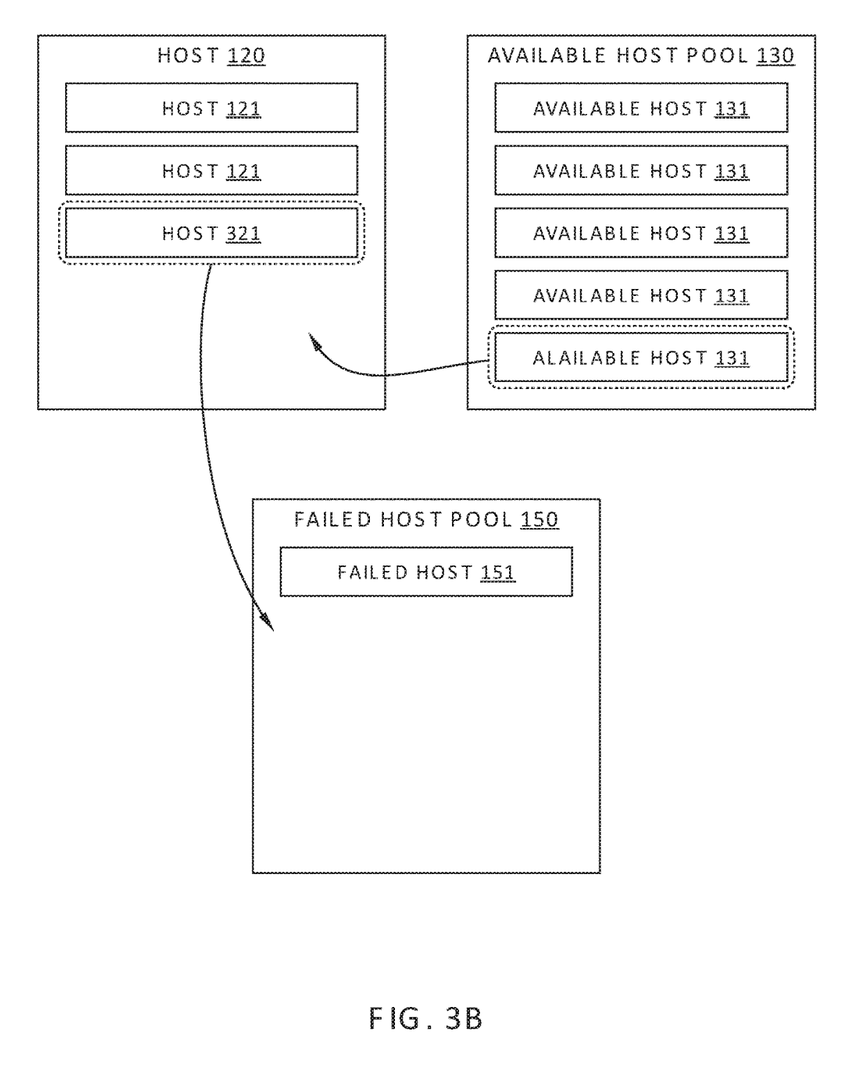
Figure 3C:
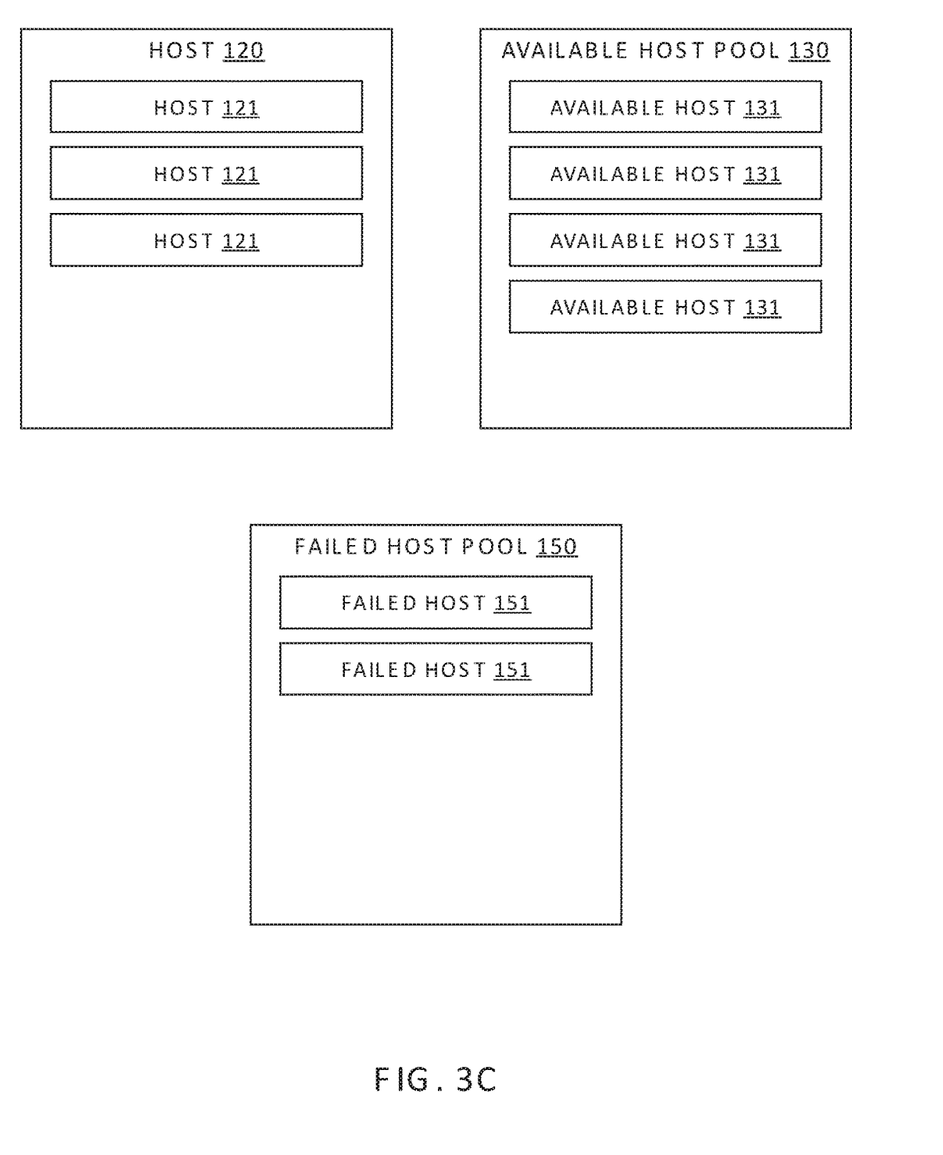

FIGS. 3A-3C are conceptual diagrams illustrating the logical removal of an available host 131 from spare host pool 130 and the logical addition of the available host 131 to one of the clusters 120, according to one or more embodiments. In one embodiment, host provisioning module 143 maintains a table for each cluster to track which hosts belong to which cluster. When a host is logically added to a cluster, the host identifier (ID) is added to the table for that cluster, and when a host is logically removed from a cluster, the host ID is deleted from the table.

FIG. 3A illustrates spare host pool 130, failed host pool 150, and one of clusters 120 of computing environment 100 prior to a triggering event that results in a change in the number of hosts 121 logically included in cluster 120. As shown, spare host pool 131 includes a plurality of available hosts 131, for example, five, cluster 120 includes multiple hosts 121, for example three, and failed host pool 150 includes one failed host 151.

FIG. 3B illustrates spare host pool 130, failed host pool 150, and one of clusters 120 of computing environment 100 after a triggering event is detected. In some embodiments, such a triggering event may be the detection of an average utilization of hosts 121 in cluster 120 exceeding a maximum threshold value or an availability of a particular VM 122 (or group of VMs 122) falling below a minimum allowable threshold value. In another embodiment, such a triggering event may be the detection of a host 121 undergoing a partial or total failure. Partial failures of a host 121 that may be considered a triggering event include the failure of a component of the host that allows continued operation of the host 121, such as a partial memory failure, a fan failure, the failure of a single disk of a multi-disk drive, the failure of a single magnetic disk drive in a host 121 that includes multiple magnetic disk drives, etc. Total failures of a host 121 that may be considered a triggering event include a software-related host freeze, complete failure of the only magnetic disk drive in the host, and any other faults or failures that prevent the continued operation of the host 121.

In response to the above-described triggering event, host provisioning module 143 adds an available host 131 to cluster 120 as a new host 321, as shown in FIG. 3B. For example, in some situations, when a failed host 322 is detected, HA module 141 may not be able to maintain an availability of a particular VM 122 or group of VMs 122 if the VMs were to be migrated from failed host 321 to different hosts 121 within cluster 120. In such a scenario, host provisioning module 143 increases the number of hosts 121 in the cluster 120 by logically adding an available host 131 from spare host pool 130, as shown. In addition, host provisioning module 143 logically removes failed host 321 from cluster 120 and logically adds failed host 321 to failed host pool 150, as shown. In another example, when DRS module 142 cannot maintain a utilization of all hosts 121 in a particular cluster 120 below a maximum allowable utilization by performing load balancing of hosts 121 within the cluster 120, host provisioning module 143 increases the number of hosts 121 in the cluster 120 by adding an available host 131 from spare host pool 130.

FIG. 3C illustrates spare host pool 130, failed host pool 150, and one of clusters 120 of computing environment 100 after the number of hosts 120 in cluster 120 has been increased, for example in response to a failure of a host 121 in cluster 120. As shown, spare host pool 131 includes one fewer available hosts 131, for example, four, cluster 120 includes the same number of hosts 121, for example three, and failed host pool 150 includes an additional failed host 151, for example two.

Figure 4:
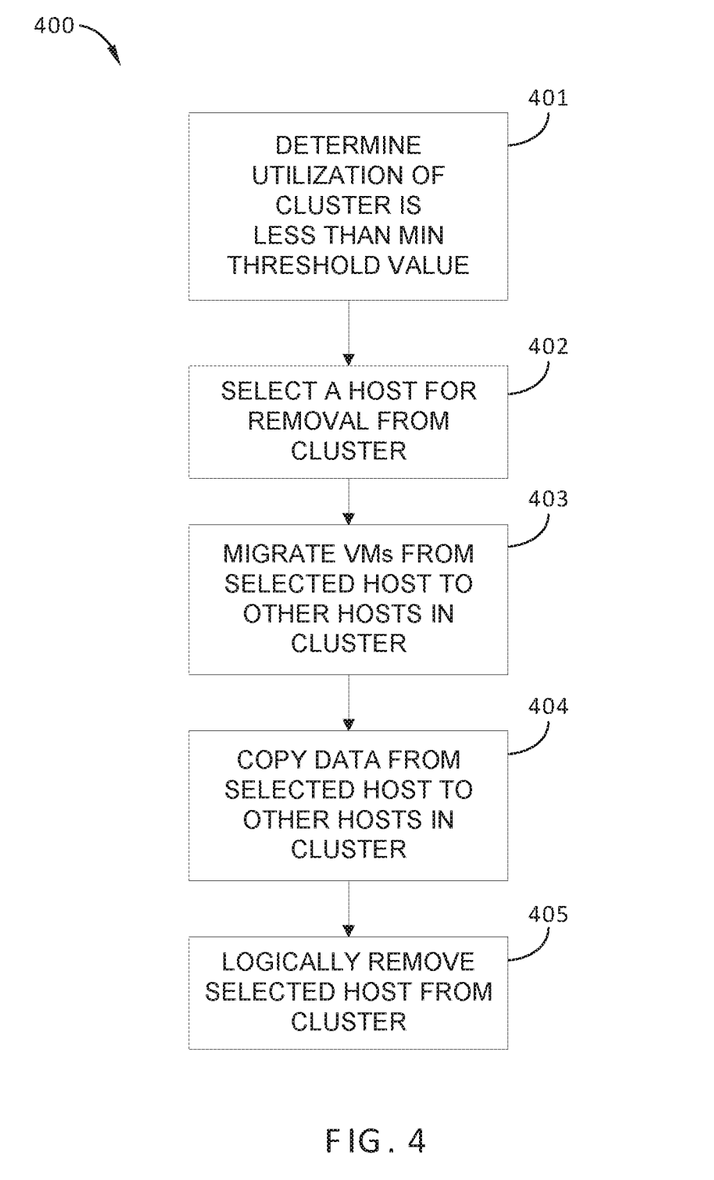
FIG. 4 sets forth a flowchart of method steps carried out by the VM management server of FIG. 1 to address low utilization in a cluster, according to one or more embodiments.

FIG. 4 sets forth a flowchart of method steps carried out by VM management server 140 to address low utilization in a cluster, according to one or more embodiments. Although the method steps in FIG. 4 are described in conjunction with computing environment 100 of FIGS. 1-3, persons skilled in the art will understand that the method in FIG. 4 may also be performed with other types of computing systems, for example, any distributed computing system that includes a cluster of host devices executing VMs.

As shown, a method 400 begins at step 401, in which resource utilization monitor 142A of VM management server 140 determines that a utilization in a particular cluster 120 is less than a minimum threshold value. For example, in some embodiments, the utilization may be a utilization of a specific host 121 in the particular cluster 120. Alternatively, the utilization may be a utilization associated with a group of hosts 121 in the particular cluster 120, or of all hosts 121 in the particular cluster 120, such as an average utilization thereof. In step 401, the utilization is typically measured or quantified via performance monitoring functions included in VM management server 140, and may be quantified in terms of computing resources in use by a host or hosts in the particular cluster, such as percentage utilization of CPU, RAM, and the like.

It is noted that because a utilization associated with the particular cluster 120 is less than the minimum threshold value, more computing resources are employed in the particular cluster 120 than are required to efficiently execute the VMs 122 currently running on the particular cluster 120. Consequently, VM management server 140 reduces the current number of hosts 121 that are logically included in the particular cluster 120 via the subsequent steps of method 400.

In step 402, in response to the determination of step 401, host provisioning module 143 VM management server 140 selects a host 121 in the particular cluster 120 to be logically removed therefrom. In some embodiments, the selected host is the host 121 in the particular cluster 120 with the highest utilization, thereby maximizing the impact on utilization in the particular cluster 120. In some embodiments, once the selected host in step 402 is selected, additional write I/O's from VMs executing on hosts 121 to the local storage resources included in the selected host are not allowed, so that data stored locally on the selected host can be moved to the remaining hosts 121. By contrast, in such embodiments, read I/O's are still permitted to the selected host, so that VMs 122 executing on hosts 121 can access object store 230 as needed.

In step 403, DRS module 142 triggers migration of VMs (performed by migration module 144) from the selected host to other hosts 121 in the particular cluster. Techniques for load-balancing between hosts 121 that are well-known in the art may be employed to complete migration of VMs from the selected host in step 403.

In step 404, DRS module 142 copies data that are stored, as part of object store 230, in local storage resources housed in the selected host. The data are copied to other local storage resources housed in one or more other hosts 121 in the particular cluster 120. Upon completion of step 404, VMs executing in the particular cluster 120 no longer access the local storage resources housed in the selected host, since all file system objects associated with VSAN 215 are stored elsewhere within the particular cluster 120.

In step 405, host provisioning module 143 logically removes the selected host from the particular cluster 120. In step 406, host provisioning module 143 logically adds the selected host to available host pool 130 as an additional available host 131.

Figure 5:
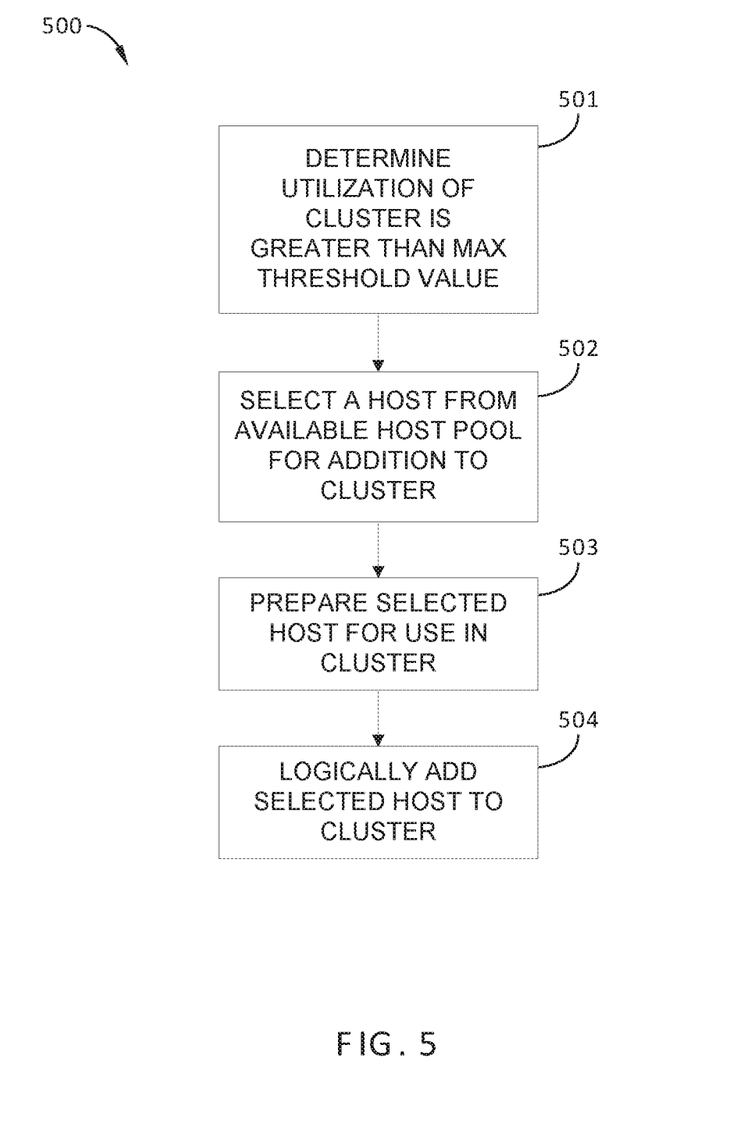
FIG. 5 sets forth a flowchart of method steps carried out by the VM management server of FIG. 1 to address high utilization in a cluster, according to one or more embodiments.

FIG. 5 sets forth a flowchart of method steps carried out by VM management server 140 to address high utilization in a cluster, according to one or more embodiments. Although the method steps in FIG. 5 are described in conjunction with computing environment 100 of FIGS. 1-3, persons skilled in the art will understand that the method in FIG. 5 may also be performed with other types of computing systems, for example, any distributed computing system that includes a cluster of host devices executing VMs.

As shown, method 500 begins at step 501, in which resource utilization monitor 142A determines that a utilization in a particular cluster 120 is higher than a maximum threshold value, where the utilization is substantially similar to that described above in step 401 of method 400, and measured as described. It is noted that because a utilization associated with the particular cluster 120 is greater than the maximum threshold value, insufficient computing resources are employed in the particular cluster 120 than are required to provide failover capacity and/or to efficiently execute the VMs 122 currently running on the particular cluster 120. Consequently, VM management server 140 increases the number of hosts 121 that are currently logically included in the particular cluster 120 via the subsequent steps of method 500.

In step 502, in response to the determination of step 501, host provisioning module 143 selects a host from available host pool 130.

In step 503, host provisioning module 143 prepares the host selected in step 502 for use in the particular cluster 120.

In some embodiments, step 503 includes imaging a hypervisor 213 on the selected host and configuring networking connections between the selected host and components of cluster 120, for example, via the HBA and/or NICs of the selected available host 131. In such embodiments, the selected host is provided permissions for accessing object store 230 and the various local storage resources of the particular cluster 120, such as SSDs 226 and/or magnetic disks 227.

In step 504, host provisioning module 143 logically adds the selected host to the particular cluster 120. For example, in some embodiments, a cluster membership data structure associated with the particular cluster 120 is modified with a unique host identifier for the selected host being added. In addition, VSAN 215 is notified of the new physical storage addresses associated with the newly added host, since these new physical storage addresses are used to back a portion of object store 230. Thus, VSAN 215 is informed of the addition of the selected host.

Figure 6:
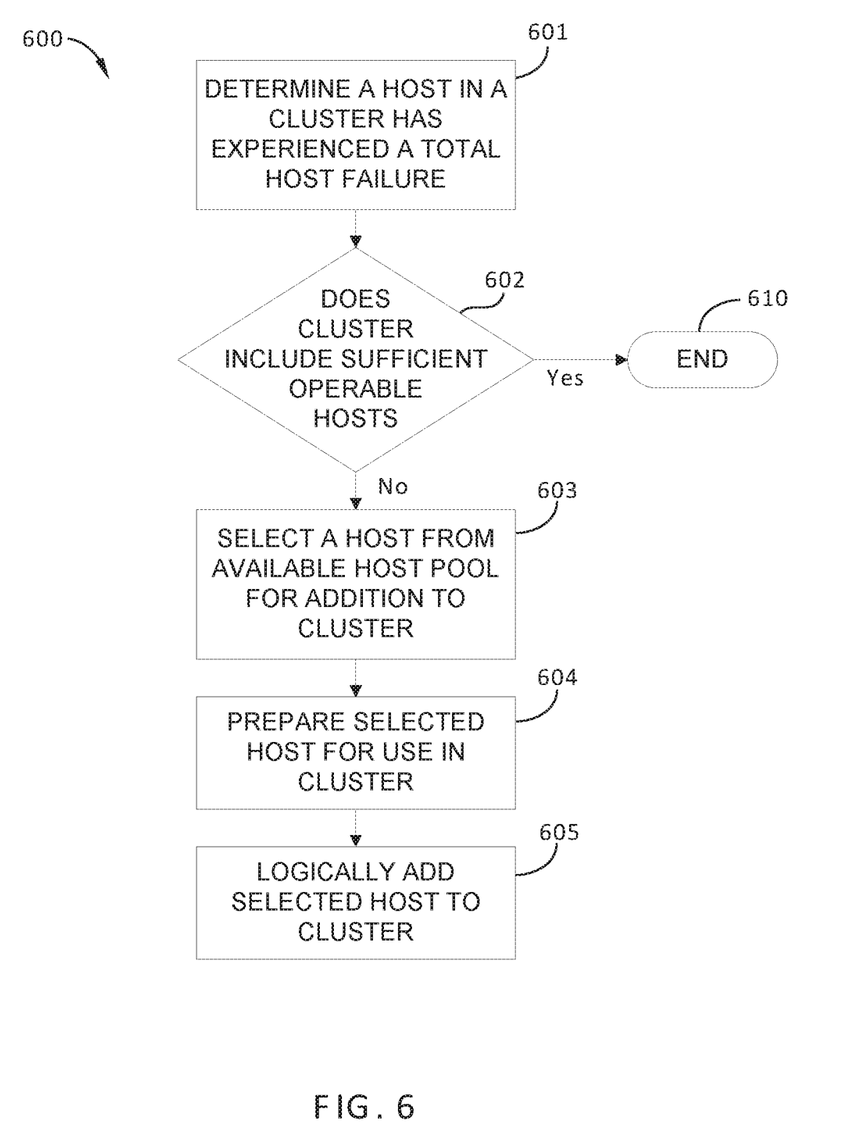
FIG. 6 sets forth a flowchart of method steps carried out by the VM management server of FIG. 1 in response to a failure of a host in a particular cluster, according to one or more embodiments.

FIG. 6 sets forth a flowchart of method steps carried out by VM management server 140 in response to a failure of a host in a particular cluster 120, according to one or more embodiments. Although the method steps in FIG. 6 are described in conjunction with computing environment 100 of FIGS. 1-3, persons skilled in the art will understand that the method in FIG. 6 may also be performed with other types of computing systems, for example, any distributed computing system that includes a cluster of host devices executing VMs.

As shown, method 600 begins at step 601, in which failure detection module 141A determines that a host 121 included in a particular cluster 120 has experienced a failure. For example, host 121 may experience a software crash or hardware fault that prevents continued operation of host 121.

In optional step 602, in response to determining that host 121 in the particular cluster 120 has experienced the crash or failure, VM management server 140 determines whether the particular cluster 120 currently includes sufficient operable hosts 121 for proper operation of cluster 120. If yes, method 600 proceeds to step 610 and terminates; if no, method 600 proceeds to step 603. Alternatively, optional step 602 is skipped and method 600 proceeds directly from step 601 to step 603.

In some embodiments, in step 602 host provisioning module 143 determines whether the particular cluster 120 currently includes sufficient operable hosts 121 based on whether the detected failure of the host 121 results in the total number of operable hosts 121 in the particular cluster 120 to be less than a predetermined minimum threshold number of hosts 121. For example, to provide sufficient failover capacity and/or redundancy in the particular cluster 120, a minimum of four operable hosts 120 may be in effect. Alternatively or additionally, in some embodiments, in step 602 VM management server 140 determines whether the particular cluster 120 currently includes sufficient operable hosts 121 based on the availability of the VMs 122 currently executing on the hosts 121 of the particular cluster 120. That is, VM management server 140 may determine whether the availability of the VMs 122 currently executing on the hosts 121 of the particular cluster 120 is greater than a minimum requirement or target. In such embodiments, VM management server 140 may determine availability based on whether there are sufficient computing resources for these VMs to execute with an acceptable latency, such as CPU processing time, available memory, and the like.

In step 603, in response to the determination of step 601, host provisioning module 143 selects a host from available host pool 130.

In step 604, host provisioning module 143 prepares the host selected in step 603 for use in the particular cluster 120. Generally, step 604 in method 600 may be substantially similar to step 503 in method 500.

In step 605, host provisioning module 143 logically adds the selected host 131 to the particular cluster 120. Generally, step 605 in method 600 may be substantially similar to step 504 in method 500.

Thus, implementation of method 600 enables the number of operable hosts 121 that are currently logically included in a particular cluster 120 to be increased when insufficient computing resources are employed in the particular cluster 120 as a result of a host failure.

Figure 7:
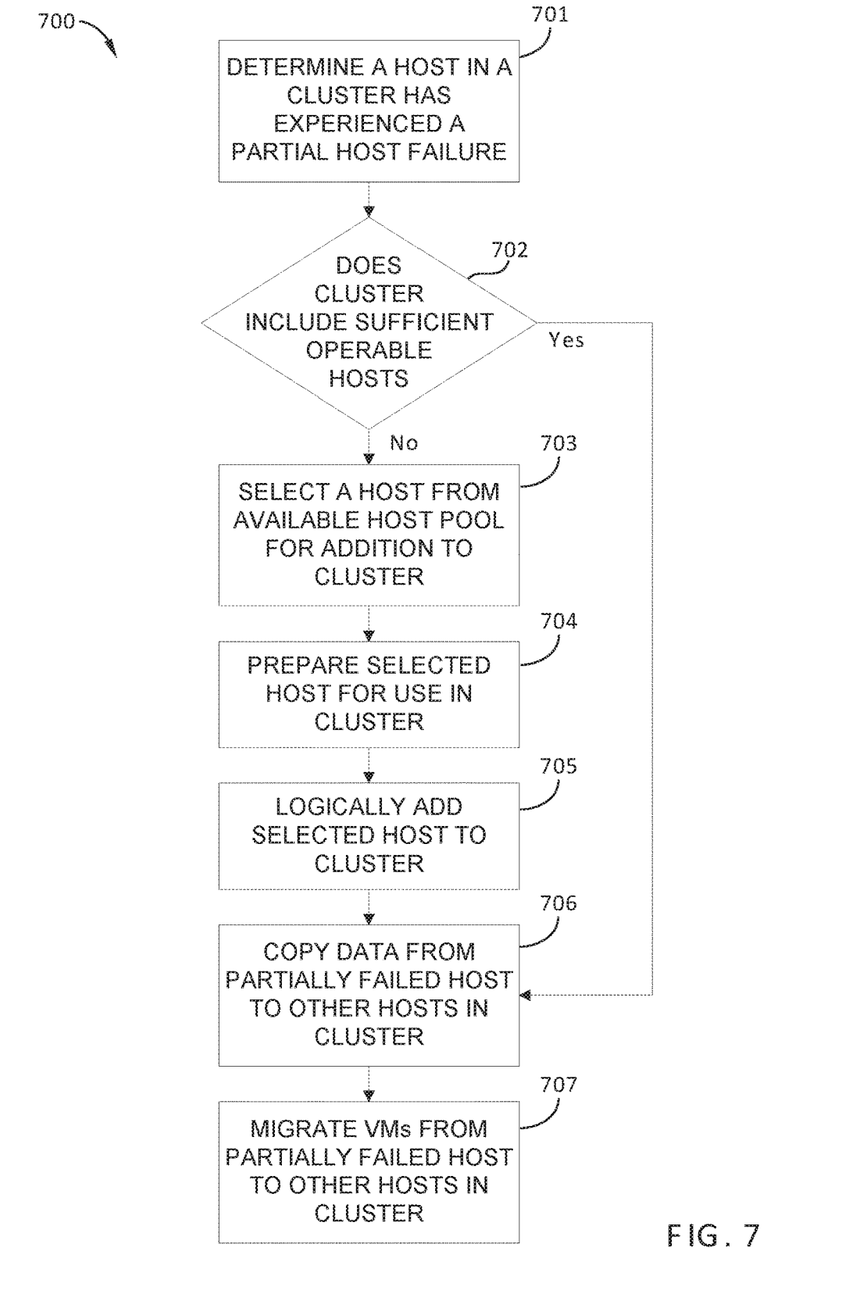
FIG. 7 sets forth a flowchart of method steps carried out by the VM management server of FIG. 1 in response to a partial failure of a host in a particular cluster, according to one or more embodiments.

FIG. 7 sets forth a flowchart of method steps carried out by VM management server 140 in response to a partial failure of a host in a particular cluster 120, according to one or more embodiments. Although the method steps in FIG. 7 are described in conjunction with computing environment 100 of FIGS. 1-3, persons skilled in the art will understand that the method in FIG. 7 may also be performed with other types of computing systems, for example, any distributed computing system that includes a cluster of host devices executing VMs.

As shown, method 700 begins at step 701, in which failure detection module 141A determines that a host 121 included in a particular cluster 120 has experienced a partial failure, and is compromised. For example, the host 121 may experience the failure of a component that allows continued operation of the host 121, such as a partial memory failure, a fan failure, the failure of a single disk of a multi-disk drive, the failure of a single magnetic disk drive in a host 121 that includes multiple magnetic disk drives, and the like. Such a host 121 is referred to hereinafter as a "compromised host." According to some embodiments, because operation of the compromised host is at least partially compromised, the compromised host is subsequently replaced in the particular cluster 120 with an available host 131 via the subsequent steps of method 700.

In optional step 702, in response to determining that a host 121 in the particular cluster 120 has experienced the partial failure, host provisioning module 143 determines whether the particular cluster 120 currently includes sufficient operable hosts 121 for proper operation of cluster 120. If yes, method 700 proceeds directly to step 706; if no, method 700 proceeds to step 703. Alternatively, optional step 702 is skipped and method 700 proceeds directly from step 701 to step 703.

In step 703, host provisioning module 143 selects a host from available host pool 130.

In step 704, host provisioning module 143 prepares the host selected in step 703 for use in the particular cluster 120. Generally, step 704 in method 700 may be substantially similar to step 503 in method 500.

In step 705, host provisioning module 143 logically adds the selected host 131 to the particular cluster 120. Generally, step 705 in method 700 may be substantially similar to step 504 in method 500.

In step 706, host provisioning module 143 copies data that are stored, as part of object store 230, in local storage resources housed in the compromised host. The data are copied to other local storage resources housed in one or more other hosts 121 in the particular cluster 120, and/or to the newly added available host 131. Upon completion of step 705, VMs executing in the particular cluster 120 no longer access the local storage resources housed in the compromised host, since all file system objects associated with VSAN 215 are stored elsewhere within the particular cluster 120.

In step 707, HA module 141 triggers migration of VMs (performed by migration module 144) from the compromised host to other hosts 121 in the particular cluster 120. In embodiments in which an available host 131 is selected in step 703, some or all VMs executing on the compromised host are migrated to the newly added available host 131. Alternatively, the VMs executing on the compromised host are instead distributed among the other hosts 121 in the particular cluster 120. Techniques for load-balancing between hosts 121 that are well-known in the art may be employed to complete migration of VMs from the compromised host in step 707.

Thus, implementation of method 700 enables the number of operable hosts 121 that are currently logically included in a particular cluster 120 to be increased when insufficient computing resources are employed in the particular cluster 120 as a result of a partial host failure.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. In a data center comprising a cluster of hosts, a spare host pool, and a failed host pool, a method of adjusting the number of hosts in the cluster, said method comprising:
    tracking membership of hosts in the cluster using a first data structures;
    tracking membership of hosts in the spare host pool using a second data structure;
    tracking membership of hosts in the failed host pool using a third data structure;
    determining that the cluster does not include a sufficient number of operable hosts based on determining that an availability of a virtual machine (VM) executing on a first host in the cluster falls below a minimum availability threshold value;
    selecting a second host from the spare host pool;
    programmatically adding an identifier of the selected second host to the first data structures;
    programmatically deleting the identifier of the selected second host from the second data structure;
    migrating the VM from the first host to the second host;
    programmatically adding an identifier of the first host to the third data structure; and
    programmatically deleting the identifier of the first host from the first data structure.

2. The method of claim 1, wherein determining that the cluster does not include a sufficient number of operable hosts is based on determining the existence of a partial or total failure of the first host in the cluster.

3. The method of claim 2, further comprising:
    copying data locally stored in the first host to a storage device accessible by the cluster.

4. The method of claim 1, wherein determining that the cluster does not include a sufficient number of operable hosts is based on determining that an average resource utilization in the first host in the cluster is greater than an upper threshold average resource utilization.

5. The method of claim 4, wherein the average resource utilization is an average CPU utilization or an average memory utilization.

6. The method of claim 1, further comprising:
    determining that an average resource utilization in a host in the cluster is less than a lower threshold average resource utilization;
    migrating all VMs from the host in the cluster with the the average resource utilization being less than the lower threshold average resource utilization to another host in the cluster; and
    programmatically adding an identifier of the host with the average resource utilization being less than the lower threshold average resource utilization to the second data structure and programmatically deleting the identifier of the host with the average resource utilization being less than the lower threshold average resource utilization from the first data structure.

7. The method of claim 6, further comprising:
    copying data locally stored in the host with the average resource utilization being less than the lower threshold average resource utilization to a storage device accessible by the cluster.

8. A non-transitory computer-readable medium comprising instructions that are executable in a computing device to cause the computing device to perform, in a data center comprising a cluster of hosts, a spare host pool, and a failed host pool, the steps of:
tracking membership of hosts in the cluster using a first data structures;
tracking membership of hosts in the spare host pool using a second data structure;
tracking membership of hosts in the failed host pool using a third data structure;
determining that the cluster does not include a sufficient number of operable hosts based on determining that an availability of a virtual machine (VM) executing on a first host in the cluster falls below a minimum availability threshold value;
selecting a second host from the spare host pool;
programmatically adding an identifier of the selected second host to the first data structures;
programmatically deleting the identifier of the selected second host from the second data structures;
migrating the VM from the first host to the second host;
programmatically adding an identifier of the first host to the third data structure; and
programmatically deleting the identifier of the first host from the first data structure.

9. The non-transitory computer-readable medium of claim 8, wherein determining that the cluster does not include a sufficient number of operable hosts is based on determining the existence of a partial or total failure of the first host in the cluster.

10. The non-transitory computer-readable medium of claim 9, wherein the steps further comprise:
copying data locally stored in the first host to a storage device accessible by the cluster.

11. The non-transitory computer-readable medium of claim 8, wherein determining that the cluster does not include a sufficient number of operable hosts is based on determining that an average resource utilization in the first host in the cluster is greater than an upper threshold average resource utilization.

12. The non-transitory computer-readable medium of claim 11, wherein the average resource utilization is an average CPU utilization or an average memory utilization.

13. The non-transitory computer-readable medium of claim 8, wherein the steps further comprise:
determining that an average resource utilization in a host in the cluster is less than a lower threshold average resource utilization;
migrating all VMs from the host in the cluster with the the average resource utilization being less than the lower threshold average resource utilization to another host in the cluster; and
programmatically adding an identifier of the host with the average resource utilization being less than the lower threshold average resource utilization to the second data structure and programmatically deleting the identifier of the host with the utilization average resource utilization being less than the lower threshold average resource utilization from the first data structure.

14. The non-transitory computer-readable medium of claim 13, wherein the steps further comprise:
copying data locally stored in the host with the average resource utilization being less than the lower threshold average resource utilization to a storage device accessible by the cluster.

15. A system of computers, comprising:
a cluster of hosts;
a spare pool of hosts;
a failed pool of hosts; and
a management server configured to:
track membership of hosts in the cluster using a first data structures;
track membership of hosts in the spare pool of hosts using a second data structure;
track membership of hosts in the failed pool of hosts using a third data structure;
determine that the cluster does not include a sufficient number of operable hosts based on determining that an availability of a virtual machine (VM) executing on a first host in the cluster falls below a minimum availability threshold value;
select a second host from the spare pool of hosts;
programmatically add an identifier of the selected second host to the first data structures;
programmatically delete the identifier of the selected second host from the second data structure;
migrate the VM from the first host to the second host;
programmatically add an identifier of the first host to the third data structure; and
programmatically delete the identifier of the first host from the first data structure.

16. The system of claim 15, wherein the management server is further configured to:
determine that the cluster does not include a sufficient number of operable hosts based on determining the existence of a partial or total failure of the first host in the cluster.

17. The system of claim 15, wherein the management server is further configured to:
determine that the cluster does not include a sufficient number of operable hosts based on determining that an average resource utilization in the first host in the cluster is greater than an upper threshold average resource utilization.

18. The system of claim 17, wherein the average resource utilization is an average CPU utilization or an average memory utilization.

* * * * *